United States Patent [19]

Kmetz et al.

[11] E Re. 30,936

[45] Reissued May 18, 1982

[54] SAFETY CONTROL FOR FURNACE BURNER

[75] Inventors: Edward R. Kmetz, Grosse Point Park; George E. Joumas, St. Clair Shore, both of Mich.

[73] Assignee: Scotty Vent Dampers, Inc., Hazel Park, Mich.

[21] Appl. No.: 208,957

[22] Filed: Nov. 21, 1980

Related U.S. Patent Documents

Reissue of:

[64] Patent No.: 4,204,833
Issued: May 27, 1980
Appl. No.: 875,328
Filed: Feb. 6, 1978

[51] Int. Cl.[3] ..... F23N 5/24

[52] U.S. Cl. ..... 431/22; 431/20; 236/1 G

[58] Field of Search ..... 431/16, 20, 21, 22; 126/116 A, 116 R, 110 R, 312; 236/1 G, 15 BB, 9 R

[56] References Cited

U.S. PATENT DOCUMENTS

| | | | |
|---|---|---|---|
| 2,184,983 | 12/1939 | Tornquist | 431/22 |
| 3,813,033 | 5/1974 | Caparone | 236/9 R |
| 4,017,024 | 4/1977 | Grostick et al. | 236/1 G X |

FOREIGN PATENT DOCUMENTS

| | | | |
|---|---|---|---|
| 2286356 | 4/1976 | France | 431/16 |

*Primary Examiner*—Carroll B. Dority, Jr.
*Assistant Examiner*—Lee E. Barrett
*Attorney, Agent, or Firm*—John R. Benefiel

[57] ABSTRACT

A burner cut-out safety control for a combustion heating device having an automatic exhaust flue damper. The safety controls act to discontinue burner operation in the event the damper actuator device or controls fail, or other flue blockage causes products of combustion to be exhausted through the draft diverter inlet opening. The control is integrated with an existing burner pilot safety circuit and pilot valve to cause the pilot valve to be closed in the event combustion gases begin to pass out of the flue through the draft diverter inlet opening, this condition being detected by a lineal temperature sensor extending about the draft diverter inlet opening, which senses combustion gas spillage by the resultant heating of any portion of the lineal temperature sensor. The lineal temperature sensor is placed in series with the pilot burner ignition temperature sensor to cause closing of the pilot valve, located ahead of the main gas valve activated by the burner controls during normal automatic operation of the burner. The fuel supply is thus cut off even if the main gas valve fails. A second temperature sensor is located in the plenum of the warm air ducting as a secondary safety control feature also acting to cause the pilot valve to close in the event of an excessive temperature being sensed in the warm air plenum.

9 Claims, 4 Drawing Figures

Fig-1
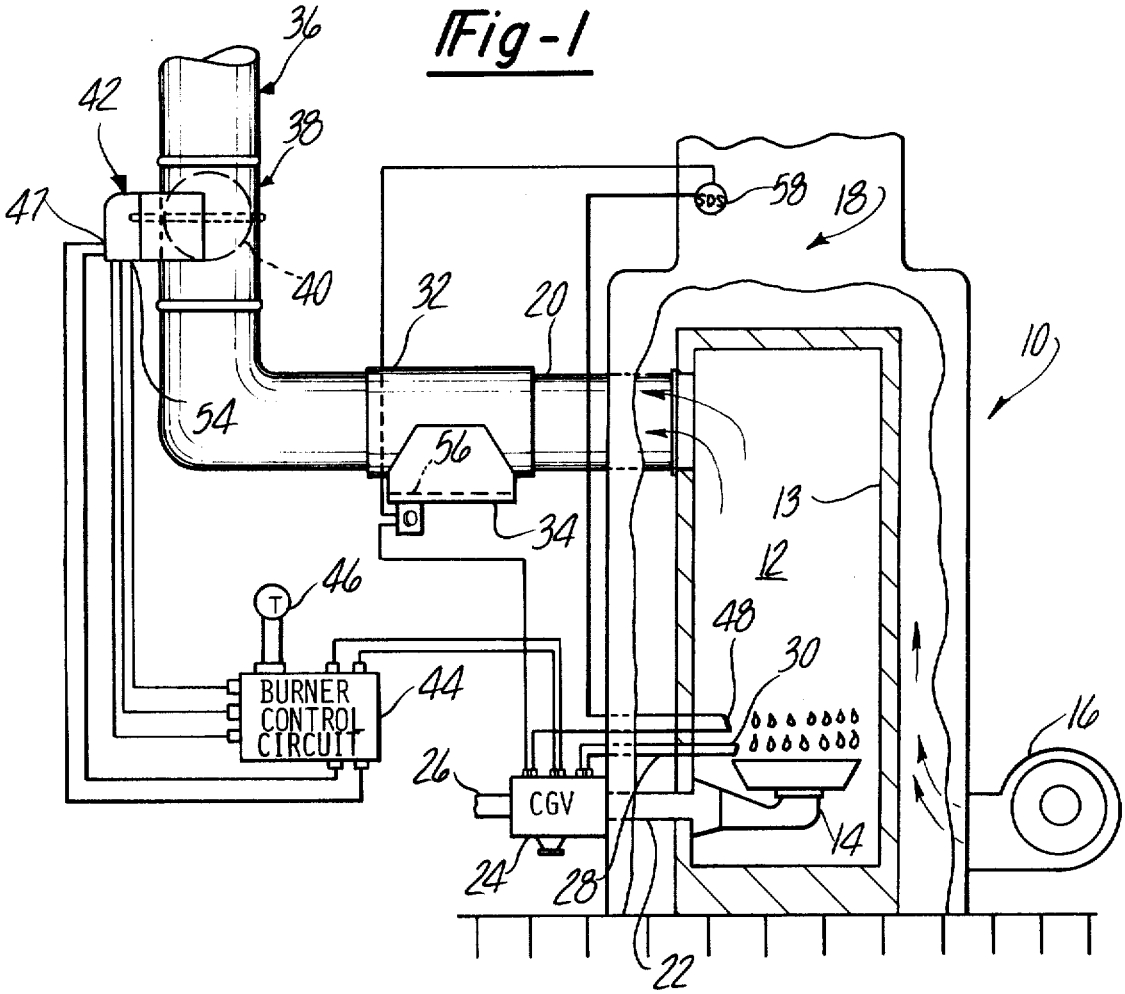
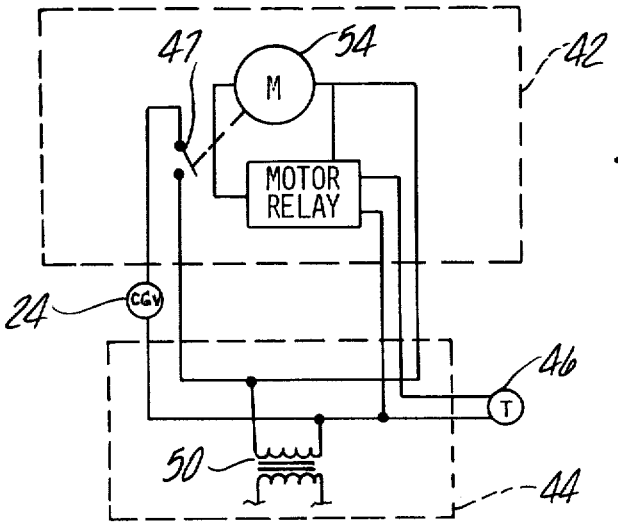
Fig-2

Fig-3
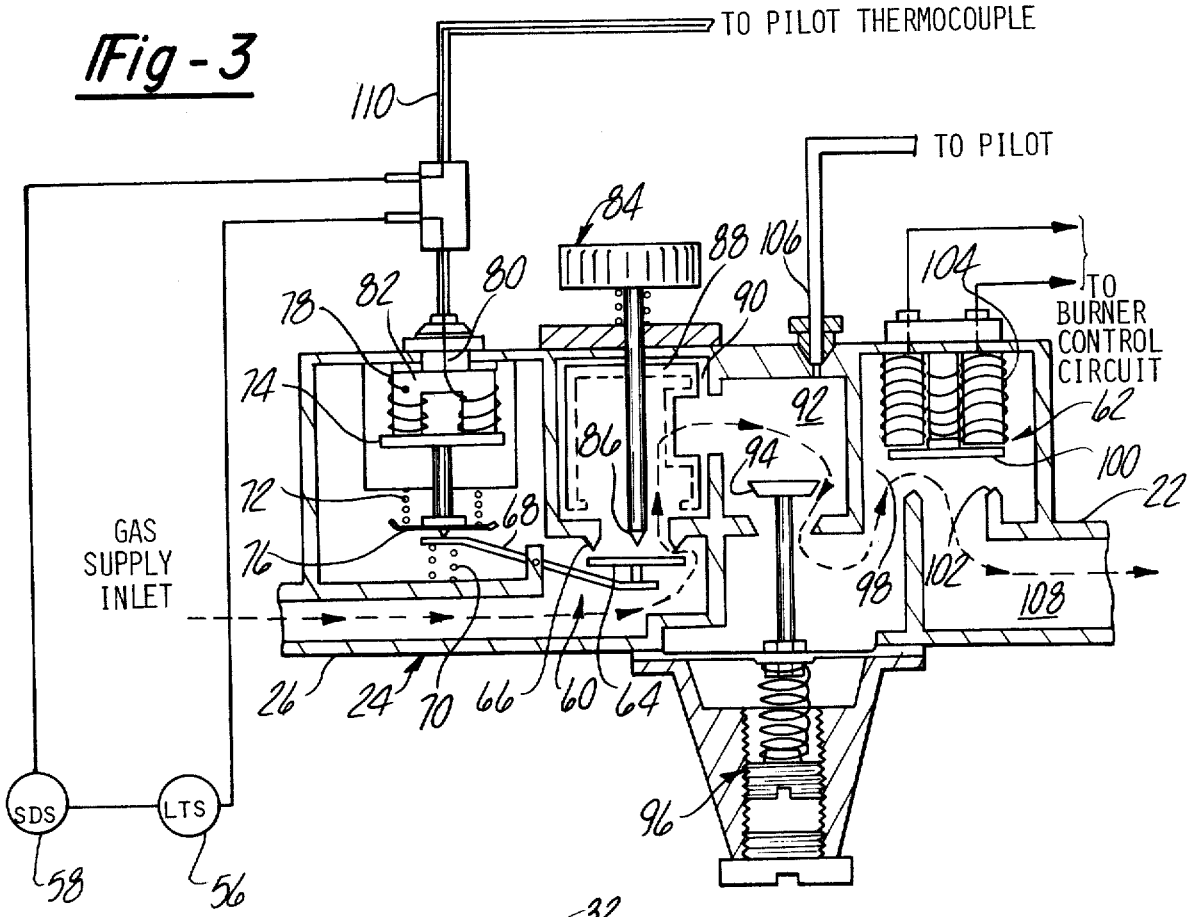
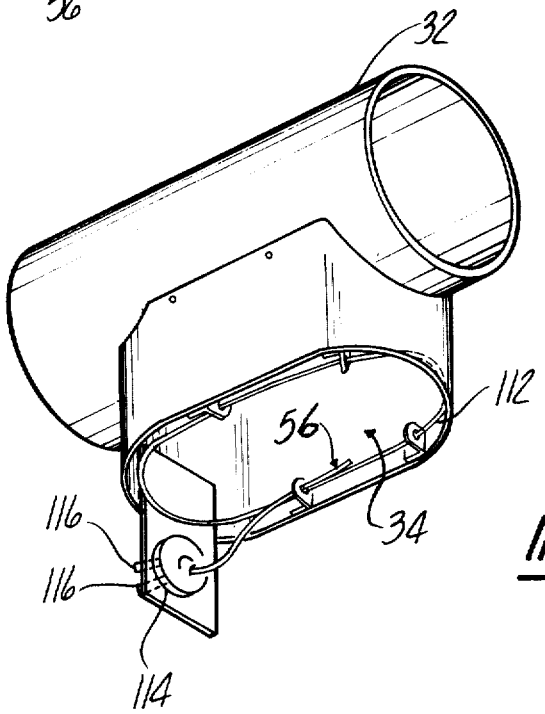
Fig-4

SAFETY CONTROL FOR FURNACE BURNER

Matter enclosed in heavy brackets [ ] appears in the original patent but forms no part of this reissue specification; matter printed in italics indicates the additions made by reissue.

BACKGROUND DISCUSSION

With the recent dramatic increases in the cost of heating fuels, particularly oil and gas, there has been increasing use of devices and design arrangements for increasing the efficiency of combustion heating devices such as oil and gas-fired furnaces or boilers.

Such combustion heating devices include an arrangement for exhausting the products of combustion to the exterior of the building by way of an exhaust or stack flue duct in communication with the combustion chamber within which the burners are located. In order to improve the draft of such exhaust ducts, there is normally incorporated a diverter hood which serves to mix room air with the exhaust gases to produce sufficient volume to get proper flow through the exhaust flue ducting. The exhaust flue thus allows the loss of warm air whenever the burner is not in operation by virtue of the rapid cooling of the combustion chamber and the heat exchanger structure, such that the stored heat is lost to the outside. In addition, without the exhaust gases flowing into the exhaust ducting, backdrafts into the building through the draft diverter inlet may occur, as well as a loss of relatively warm room air through the draft diverter opening.

Accordingly, automatic damper devices have been devised and utilized which serve to automatically close the exhaust flue ducting when the burner is not in operation. Such devices are activated with the burner control such as to insure that the burner is only operated when the damper device is opened. Reference is made to U.S. Pat. No. 4,039,123 as typical of these devices.

The incorporation of such an automatic flue damper device presents a safety hazard since in the event of a failure in the system resulting in continuing burner operation with the damper actuator in the closed position, the products of combustion tend to spill into the confined space within the building via the draft diverter opening, presenting a hazard to the occupants of the building. The actuator controls are designed to be fail-safe in that the thermostat signal first causes the actuator device to be moved to the open position and then, upon movement of the damper to the open position, an end switch or other similar device is closed to enable burner operation. This enablement is by activating the main valve typically associated with the combustion device burner allowing the oil or gas to be delivered to the burner. In the event of a component failure, such as the main valve being stuck in the open position or other failure, operation of the burner may continue even though the controls call for the burner to be shut off.

Thus, such devices sometimes include a thermostatically operated safety switch in the exhaust stack or draft diverter to sense the resultant high temperature condition existing in the exhaust ducting.

The arrangement described in U.S. Pat. No. 4,039,123 includes a thermostatic switch to interrupt the energization of the automatic flue damper motor which allows a spring to open the damper. However, this still allows continued operation of the burner, and the stuck main gas valve or other failure would not promptly come to the attention of those operating or observing operation of the furnace.

In addition, the opening of the damper cools the switch upon allowing reenergization of the damper motor such that a cycling of the actuator could take place all while the failure of the main gas valve goes undetected.

Temperature sensors associated with the exhaust flue ducting and hence the draft diverter inlet opening present difficulties even though the diverter opening is theoretically a good location to sense blockage of the flue damper and abnormally high temperatures inasmuch as the spillage of combustion gases provides a rapidly developed high temperature condition.

However, the flow pattern through the diverter opening of such combustion gases due to the relatively low volume of combustion gases relative to the volume of inducted air is such that the flow of exhaust gases will not be evenly distributed across the opening of the draft diverter. That is to say, the high temperature condition may be localized at some portion of the draft diverter openings. Accordingly, a sensor which is discretely located at a point within the opening must be located at the particular region whereat the combustion gases tend to exit. This requires tedious flow testing of the system at installation, requiring a skilled service technician to carry it out.

Another condition which may occur due to power failure or other malfunction is the operation of the burners without the air circulation blower being in operation. This causes overheating of the heat exchanger and excessive furnace temperatures. While combustion chamber temperature conditions have been sensed in prior art safety control arrangements, it is difficult to design sensor components to reliably distinguish between normal and abnormal temperature conditions.

While warm air plenum located sensors have been utilized in the past to detect this condition in a more reliable manner, they have relied on shutdown of the main gas valve to correct the situation. In some cases, the main gas valve failure is the cause of the problem and prevents correction of the condition.

It is therefore an object of the present invention to provide a safety control arrangement for combustion heating devices which insure that burner operation will be discontinued in the event of a component failure or other occurrence which results in burner operation with a blocked flue duct such as automatic flue dampers being in the closed position during burner operation.

It is yet another object of the present invention to provide a safety control incorporating a temperature sensor located in the draft diverter inlet opening which does not require complicated testing to determine the proper sensor location.

It is yet another object of the present invention to provide such a safety control arrangement in which the controls may be readily incorporated in the existing burner control circuits without major modifications such that the costs and difficulty of adding the control circuits to such designs is minimized.

It is a further object of the present invention to provide a safety control arrangement for reliably detecting a combustion chamber overheating condition and causing shutdown of burner operation.

SUMMARY OF THE INVENTION

These and other objects of the present invention, which will become apparent upon a reading of the following specification and claims, are accomplished by a safety control which is integrated into the existing pilot safety control circuit such as to prevent fuel delivery to the main control valve in the event an abnormally high temperature is sensed in the draft diverter inlet opening. The safety control arrangement includes a lineal temperature sensor tube which extends entirely about the draft diverter inlet opening with any portion of the tube heated to a predetermined temperature corresponding to abnormal system operation of the burner with the stack damper closed or the flue blocked. This causes interruption of the pilot safety control circuit to close the pilot valve, precluding further burner operation. The safety control may be integrated into low voltage-thermocouple pilot safety circuits by placing the lineal temperature sensor in series with the thermocouple sensing pilot ignition, or alternatively the lineal temperature sensor may be interposed into intermittently operated pilot control circuits, to cause the pilot safety valve to be closed upon detection of the abnormal temperature condition.

A warm air plenum temperature sensor is also incorporated into the safety control as a further safety measure.

DESCRIPTION OF THE DRAWINGS

FIG. 1 is a simplified diagrammatic representation of a typical combustion device together with the exhaust flue damper actuator and controls therefor and illustrating in diagrammatic form the safety control system arrangement according to the present invention.

FIG. 2 is a circuit diagram of the furnace controls associated with the actuator device.

FIG. 3 is a diagrammatic representation of the safety controls according to the present invention associated with the main gas valve of a gas-fired combustion heating device.

FIG. 4 is a perspective view of the installation of a lineal temperature sensor into the inlet opening of the draft diverter section of exhaust flue ducting.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

In the following detailed description, the particular application of the invention described will be of a gas-fired, forced-air furnace and is a typical application of the present invention. However, it is to be understood that other combustion heating devices may also utilize the arrangement of the present invention, such as oil-fired furnaces or boilers.

In addition, a particular type of pilot safety typical of present-day gas furnace designs is described in combination with the safety controls according to the present invention.

In this type of safety control, the pilot is lit and remains continuously lit. In the event the pilot becomes extinguished or fails to be lit, a thermocouple sensor is positioned with respect to the pilot flame to sense pilot ignition which causes a pilot safety valve to be closed in the event the pilot becomes extinguished or fails to be lit.

In these designs, there is typically incorporated a low energy or millivolt circuit in which a millivoltage generated by the thermocouple is used to operate a pilot hold-in coil. In the presence of the millivoltage impressed on the hold-in coil, a pilot valving member is held in the open position to allow gas flow to the main gas valve which is operated by the burner controls as heating is required.

Alternatively, however, there are currently being adopted intermittently operated gas pilot circuits which do not incorporate such a millivoltage or low energy circuit in order to operate the pilot safety valve, but rather are integrated and operated by the normal low voltage (24 volt) control system used in the thermostat circuit. It should be understood that the present safety control system is applicable to such 24 volt pilot safety circuits and to other safety controls associated with oil-fired combustion devices.

Referring to FIG. 1, the application to a gas furnace 10 is depicted in diagrammatic form. The gas furnace 10 includes a combustion chamber 12 within which is disposed gas burner 14. The burning within the combustion chamber 12 heats the combustion chamber 12 and associated air heat exchanger firepot 13, around which is circulated the air to be heated by a blower 16 which passes about the combustion chamber 12 and into the warm air plenum 18 and thence is distributed through the warm air ducting system to the areas to be heated.

The combustion chamber 12 is connected to the outside via exhaust ducting means generally represented at 20 in communication with the combustion chamber 12. The gas burner 14 is supplied with gas via a pipe connection 22 which is supplied via a combination gas valve 24 which serves to supply gas to the burner 14. When open, the combination gas valve 24 allows gas received from a supply pipe 26 to flow to the burner 14.

The pilot supply tube 28 is provided, which supplies a pilot burner 30 disposed opposite the jets of the burner 14 such as to cause ignition of the gas supplied to the burner 14 whenever the pilot nozzle is lit and gas supplied via combination gas valve 24.

The exhaust ducting means 20 includes a diverter section 32 which has an inlet 34 which mixes room air into the products of combustion flowing out through the exhaust ducting means 20. The exhaust ducting means 20 further includes a stack section 36 within which is disposed an automatically-operated damper assembly 38, which is movable between the open and closed positions to either open the exhaust ducting means 20 to a vent position, or to close the damper disc 40 to seal off communication with the exhaust stack and the outside, preventing backdrafts and the escape of room air and the heated air present within the combustion chamber 12, after the exhaust gases have passed out through the exhaust stack 36.

The damper disc 40 is operated by means of a damper actuator mechanism 42 which in turn is controlled as is the combination gas valve 24 by the operation of a burner control circuit 44. The burner control circuit 44 operates to control the combination gas valve 24 such that when a room thermostat 46 signals a demand for heat, i.e., burner operation, a signal is generated which causes actuation of the damper actuator mechanism 42 to rotate the motor to the disc open position.

Upon achieving the open position, an end switch 47 associated with the damper actuator mechanism 42 enables a control signal to be transmitted to the combination gas valve 24 such as to permit gas flow to the burner 14.

This operation occurs assuming that the pilot 30 is properly ignited since there is provided a pilot ignition safety circuit in the system including a thermocouple 48 which senses the high temperature heated by the pilot flame. The pilot flame generates a millivoltage which is impressed on a pilot valve hold-in coil included within the combination gas valve 24 which permits gas flow to pass through the pilot valve within the combination gas valve 24 to the main gas valve portion controlled by the burner control circuit 44.

Upon the thermostat 46 contacts opening due to achievement of the proper room temperature, the burner control circuit 44 causes the damper actuator mechanism 42 to rotate damper disc 40 from the full open position which causes opening of the end switch 47 and closes the main gas valve portion of the combination gas valve 24 causing the burner 14 to cease operation.

This portion of the burner control circuit is shown in FIG. 2 in which the 24 volt control voltage generated by the transformer 50 is applied to the damper actuator motor 54 via the motor relay which controls the movement of the damper actuator mechanism 42 to either the open or closed position.

The movement of the damper actuator mechanism 42 to the open position closes an end switch 47 which in turn allows the control voltage to be applied to the combination gas valve 24 to thus enable burner operation. Upon opening of the thermostat 46 contacts to the actuator motor 54, it causes the damper actuator mechanism 42 to be rotated to the closed position which opens the end switch 47 and thus discontinues operation of the burner 14 by closing of the combination valve.

Referring again to FIG. 1, the safety controls according to the present invention include the provision of a lineal temperature sensor 56 located within the draft diverter inlet 34. The lineal temperature sensor 56 is placed in series with the pilot thermocouple sensor 48 which in turn serves to control the pilot valve as noted, contained within the combination gas valve 24. When the circuit is interrupted by the lineal temperature sensor 56 upon reaching a predetermined temperature, the generated voltage of the thermocouple 48 can no longer act on the pilot valve hold-in coil and causes this valve to shut down and discontinue further burner operation, whether or not the main gas valve is opened or closed.

In addition, a second discrete location temperature sensor such as a snap disc temperature sensor 58 is located in the warm air plenum 18 and senses the abnormally high temperatures in the plenum (i.e., 190° F.) caused by overheating of the unit and the resultant unsafe condition. This sensor 58 is also placed in series with the pilot safety control millivolt circuit as shown in FIG. 1, to cause closing of the pilot valve upon an abnormal temperature developing in either the plenum 18 or at the diverter inlet 34.

Details of the safety control arrangement in relationship with the combination gas valve 24 are indicated in FIG. 3.

A combination gas valve 24 of a commercially available configuration is depicted in partial section in FIG. 3. Such a CGV valve 24 has its inlet connected to the gas supply line 26 and its outlet to the burner supply line 22. Such a combination gas valve typically includes a pilot valve section 60 which is upstream from the main gas valve 62, controlled by the burner control circuit 44.

The pilot valve 60 includes a valve disc 64 adapted to be seated and unseated on a valve seat 66 to control gas flow therethrough. The valve disc 64 position in turn is controlled by a valve lever 68 pivotally supported intermediate its length with its opposite end to the end which supports the valve disc 64 engaged by a valve opening spring 70 and a valve closing spring 72. The valve closing spring 72 is adapted to be overcome by movement of a plunger 74 which acts to compress the closing spring 72 by a collar 76 movement to the compressed position being achieved manually when the pilot is lit.

The holding of the plunger 74 in its compressing position is carried out by a pilot valve hold-in coil 78 energized by the voltage generated by the thermocouple 48. The coil windings pass about a core 82 in order to magnetize the core 82, precluding the force of the closing spring 72 from acting on the valve lever 68.

This allows the valve opening spring 70 to maintain the valve lever 68 in the open position.

As noted, to open the valve initially and overcome the pressure acting on the seated valve disc 64, a pilot valve plunger 84 is provided which has a stem 86 engaging the valve disc 64. When the pilot is to be lit, the plunger handle 84 is depressed, overcoming the pressure acting on the valve disc 64 and the pilot burner 30 is lit while the plunger handle 84 is depressed.

The resulting voltage generated by the thermocouple magnetizes the hold-in coil winding core 82 to maintain the open position of the valve disc 64 allowing communication of the gas through the valve seat 66.

The pilot plunger valve 84 may also act as a manual shutoff by controlling a rotary valve member 88 disposed within a chamber 90 immediately downstream of the valve seat 66.

The gas passing through the valve seat 66 flows into a regulator valve chamber 92 and past a regulating valve member 94, the position of which may be adjustable by means of a pressure regulator adjustment device 96 and thence into the main gas valve chamber 98. The main gas valve 62 includes a valve member 100 which cooperates with the valve seat 102. The valve member 100 is electromagnetically operated by means of a magnetic actuator 104 which in turn is energized by the burner control circuit 44. The supply pilot passage 106 is in communication with the regulator chamber 92 while the valve chamber 108 downstream of the main gas valve 102 is in communication with the burner supply line 22.

According to the concept of the present invention, the thermocouple leads 110 are electrically connected to the hold-in coil windings 80 and are placed in series with the snap disc sensor 58 as well as the lineal temperature sensor 56, such that both switches or sensors must be closed indicating a normal temperature condition in order for voltage to be applied across the hold-in coil windings 80.

Accordingly, if an abnormal temperature condition is sensed, the hold-in coil 80 is deenergized allowing the closing spring 72 to close the valve disc 64 preventing gas flow at a point downstream of the system. Thus, even if the main gas valve 62 remains stuck open, burner operation ceases.

The lineal temperature sensor is a device which is known, per se. This device includes (FIG. 4) a length of copper tubing 112 which has formed therein a very small capillary sized opening which provides a fluid pressure communication on opposite sides of a diaphragm switch 114. The diaphragm switch 114 controls the electrical connection between a pair of terminals 116 which are placed in series with the thermocouple connection and the burner pilot safety controls as described. Upon any portion of the tube 112 being heated to a predetermined temperature which, for the present application is on the order of 250° F. to 260° F., the small capillary passage becomes closed off due to the expansion of the copper tubing which causes pressure unbalance on the diaphragm 114 and breaking the electrical connection with the contacts 116. Since such devices are known in the art per se, a detailed description will not be included here.

The installation, as can be seen in FIG. 4, includes a mounting of a length of tubing 112 entirely about the diverter opening inlet 34, with a slight spacing from the walls of the diverter opening inlet 34. This insures that if the gas spillage takes place at any point about the periphery of the draft diverter inlet 34, the lineal temperature sensor 56 causes interruption of the burner pilot safety control circuit and shut down of the burner.

In similar fashion, the plenum snap disc sensor 58 is a temperature sensing device well known in the art and comprises a bimetal spring disc causing making and breaking of a circuit responsive to a predetermined temperature being sensed by the snap disc sensor 58.

Similarly, this causes interruption of the burner pilot safety circuit.

Accordingly, it can be seen that the safety control, according to the present invention, when associated with an automatic vent damper nearly completely eliminates hazards in such systems having automatic flue dampers in a most reliable manner. The enhancement of the safety characteristics of the heating device so equipped is by a relatively simple and low cost component which is easily installed by relatively unskilled persons, i.e., the need for elaborate flow testing in order to properly locate the diverter inlet temperature sensor is not required to insure proper function.

The incidence of failure of the main gas valve which has compromised the safety of the typical prior art systems have been avoided.

Indeed, the safety controls, according to the present invention, enhance the safety of the furnace over and above that of the furnace controls on a furnace arrangement not having the automatic flue damper actuator and indeed could be applied to furnaces and other similar heating devices to improve safety even if not equipped with the automatic flue damper. That is, the high temperature condition sensed provides a safety measure against any blockage of the exhaust stack tending to create a backup of the combustion gases into the building spaces.

In addition, the condition in which burner operation continues without blower operation is very reliably corrected by sensing of the condition at the warm air plenum and shut down of the burner by acting on the pilot valve.

The embodiments of the invention in which an exclusive property or privilege is claimed are defined as follows:

1. In combination, a safety control arrangement and a combustion heating device of the type having a burner ignition safety circuit detecting ignition of the fuels burned within the combustion chamber of the heating device, the combustion heating device further having an exhaust vent means for exhausting the products of combustion of said combustion chamber, said exhaust means including a draft opening having an inlet to induct air into said exhaust means, said safety control arrangement comprising:

a temperature sensor located in said draft opening inlet, comprising a lineal sensor consisting of a sensor tube extending about said inlet to sense spillage of combustion gases therethrough at any point along the periphery of said inlet;

control means responsive to the sensing of an abnormal temperature condition by said temperature sensor in the exhaust vent means causing said burner ignition safety circuit of said heating device to be activated;

whereby said burner ignition safety circuit also acts as a safety shutdown of burner operation in the event an abnormal temperature condition develops in said exhaust vent means.

2. The safety control arrangement according to claim 1 wherein said burner ignition safety circuit arrangement comprises a thermocouple heated by combustion of said fuel and wherein said burner ignition safety circuit further includes a pilot burner adapted to ignite said burner, wherein said thermocouple is positioned to be heated by ignition of said pilot burner and wherein said voltage generated by said thermocouple operates said burner ignition safety circuit.

3. The safety control arrangement according to claim 2 wherein said burner ignition safety circuit further includes a pilot control valve and further including a pilot valve hold-in coil and wherein said safety control includes means for impressing said thermocouple voltage on said hold-in coil, said pilot valve being manually operable to be held open while said burner is ignited and said thermocouple voltage serves to hold said pilot burner, and wherein said safety control arrangement includes means interposing said temperature sensor in series in said thermocouple circuit so as to interrupt said thermocouple hold-in coil circuit upon sensing of said abnormal temperature condition.

4. The safety control arrangement according to claim 1 wherein said combustion heating device further includes a damper mounted in said exhaust vent means, said damper including a damper disc movable between an open and closed position, and further including a damper actuator and control means associated with said combustion heating device causing said damper disc to be opened whenever said burner is in operation and said damper actuator to be closed whenever said burner is not in operation, whereby said safety control arrangement precludes burner operation with said damper disc closed.

5. The safety control arrangement according to claim 1 wherein said combustion heating device further includes a main valve and a burner control circuit causing automatic operation of said main valve to control said burner operation, and further including a pilot burner position to cause ignition of said burner and also a pilot valve located upstream of said main valve and wherein said burner ignition safety circuit includes means for closing said pilot valve in the event said pilot burner is not ignited, and wherein said control means includes means responsive to sensing of an abnormal temperature condition by said temperature sensor to cause said pilot control valve to be closed.

6. The safety control arrangement according to claim 5 wherein said burner ignition safety circuit further includes a thermocouple located with respect to said pilot burner to be heated thereby and wherein said means for causing pilot valves to be closed includes an electrical circuit comprised of said thermocouple and a hold-in coil operatively associated with said pilot valve to hold said pilot valve in the open position whenever said thermocouple is heated by said pilot burner, and wherein said safety control arrangement includes means interposing said temperature sensor in said circuit connecting said thermocouple and said pilot burner hold-in coil so as to cause said circuit to be interrupted upon sensing of said abnormal temperature conditions.

7. The safety control arrangement according to claim 1 wherein said combustion heating device comprises a warm air furnace, said furnace including heat exchanger means adapted to be heated by said burner operation, said furnace further including means for circulating air over said heat exchanger to be heated thereby and also including a warm air plenum chamber receiving said air after being circulated over said heat exchanger means, the safety control arrangement further including a plenum temperature sensor located in said warm air plenum and means responsive to the development of an abnormally high temperature condition sensed by said temperature sensor in said plenum chamber to cause said burner ignition safety circuit of said furnace to be activated, whereby said burner ignition safety circuit further acts as a safety to shut down burner operation upon development of an abnormally high temperature condition in said warm air plenum.

8. A safety control arrangement for a combustion heating device of the type having a combustion chamber, a burner disposed therein, fuel feed means supplying fuel to said burner and an exhaust vent means venting said combustion chamber, said exhaust vent means including a draft opening having an inlet for inducting air into said exhaust vent opening, said arrangement comprising:

a lineal temperature sensor located in said exhaust vent means consisting of a sensor tube extending about said draft opening inlet sensing gas spillage at any point along said inlet;

means responsive to the sensing of an abnormal temperature condition by said temperature sensor at said draft opening to cause said fuel feed means to shut off fuel flow to said burner;

whereby said burner acts as producing a shutdown of burner operation in the event an abnormal temperature condition develops in said exhaust vent means.

*9. A safety control arrangement for a combustion heating device of the type having a combustion chamber, a burner disposed therein, fuel feed means controllably supplying fuel to said burner, an exhaust vent means venting said combustion chamber to the atmosphere, and said device including an inlet opening for inducting ambient air, said inlet in fluid communication with said exhaust vent means so as to be subject to outflow of the products of combustion from interruption of flow through said exhaust vent means, said arrangement comprising:*

*lineal temperature sensor means located to sense outflow of combustion products through said air inlet opening, said means including a sensor tube extending about said inlet opening so as to sense outflow of said combustion products at any point through said inlet opening, said sensor tube including means responsive to being heated to a predetermined elevated temperature corresponding to contact with said outflow of products of combustion at any location along its length to generate a control signal;*

*control means responsive to said sensing of an abnormal temperature condition by said sensor tube at said inlet opening and generation of said control signal causing said fuel feed means to shut off fuel flow to said burner;*

*whereby said control means acts to produce shutdown of burner operation in the event of any blockage of said exhaust vent means causing outflow of combustion products through said inlet opening.*

* * * * *